United States Patent
Wang et al.

(10) Patent No.: US 10,713,865 B2
(45) Date of Patent: Jul. 14, 2020

(54) METHOD AND APPARATUS FOR IMPROVING VEHICLE LOSS ASSESSMENT IMAGE IDENTIFICATION RESULT, AND SERVER

(71) Applicant: ALIBABA GROUP HOLDING LIMITED, Grand Cayman (KY)

(72) Inventors: Zixiao Wang, Hangzhou (CN); Guanru Li, Hangzhou (CN); Jian Wang, Hangzhou (CN); Kan Zhang, Hangzhou (CN); Fan Zhou, Hangzhou (CN); Taiwei Zhang, Hangzhou (CN); Taifei Fan, Hangzhou (CN); Danni Cheng, Hangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 0 days.

(21) Appl. No.: 16/714,722

(22) Filed: Dec. 14, 2019

(65) Prior Publication Data

US 2020/0118365 A1  Apr. 16, 2020

Related U.S. Application Data

(63) Continuation of application No. PCT/CN2018/107526, filed on Sep. 26, 2018.

(30) Foreign Application Priority Data

Sep. 29, 2017 (CN) .......................... 2017 1 0911173

(51) Int. Cl.
*G06K 9/00* (2006.01)
*G06Q 10/10* (2012.01)
(Continued)

(52) U.S. Cl.
CPC ....... *G07C 5/0808* (2013.01); *G06K 9/00671* (2013.01); *G06Q 10/20* (2013.01)

(58) Field of Classification Search
CPC ... G07C 5/0808; G06K 9/00671; G06Q 10/20
See application file for complete search history.

(56) References Cited

U.S. PATENT DOCUMENTS

| | | |
|---|---|---|
| 6,185,540 B1 | 2/2001 | Schreitmueller et al. |
| 7,596,242 B2 | 9/2009 | Breed et al. |
| (Continued) | | |

FOREIGN PATENT DOCUMENTS

| | | |
|---|---|---|
| AU | 761195 B2 | 5/2003 |
| CN | 103310223 A | 9/2013 |
| (Continued) | | |

OTHER PUBLICATIONS

First Search and First Office Action for Taiwanese Application No. 107118448, dated Apr. 12, 2019, 6 pages.
(Continued)

*Primary Examiner* — Yubin Hung

(57) ABSTRACT

Embodiments of this specification disclose a method and an apparatus for automotive part recognition based on a vehicle damage assessment image. The method includes: determining a damaged automotive part of a vehicle by recognizing a damage assessment image of the vehicle based on an image recognition algorithm; obtaining an automotive part list of the vehicle, wherein the automotive part list comprises a plurality of automotive parts corresponding to a plurality of automotive part identification serial numbers; matching the damaged automotive part with the plurality of automotive parts in the automotive part list to determine an automotive part corresponding to the damaged automotive part; and outputting an automotive part identification serial number of the determined automotive part.

17 Claims, 4 Drawing Sheets

(51) Int. Cl.
*G07C 5/08* (2006.01)
*G06Q 10/00* (2012.01)

(56) References Cited

U.S. PATENT DOCUMENTS

| | | | |
|---|---|---|---|
| 7,676,062 | B2 | 3/2010 | Breed et al. |
| 7,889,931 | B2 | 2/2011 | Webb et al. |
| 8,510,196 | B1 | 8/2013 | Brandmaier et al. |
| 8,515,152 | B2 | 8/2013 | Siri |
| 9,218,698 | B2 | 12/2015 | Ricci |
| 10,332,209 | B1 | 6/2019 | Brandmaier et al. |
| 10,380,696 | B1* | 8/2019 | Haller, Jr. .............. G06K 9/00 |
| 10,387,960 | B2 | 8/2019 | Tofte et al. |
| 2004/0019534 | A1* | 1/2004 | Callahan ............ G06Q 10/087 705/26.8 |
| 2007/0250232 | A1 | 10/2007 | Dourney, Jr. et al. |
| 2009/0138290 | A1 | 5/2009 | Holden |
| 2009/0265193 | A1 | 10/2009 | Collins et al. |
| 2011/0060732 | A1* | 3/2011 | Bonneau ............ G06Q 30/0603 707/722 |
| 2011/0161182 | A1 | 6/2011 | Racco |
| 2013/0297353 | A1 | 11/2013 | Strange et al. |
| 2013/0317865 | A1* | 11/2013 | Tofte ..................... G06Q 40/08 705/4 |
| 2014/0257627 | A1 | 9/2014 | Hagan, Jr. |
| 2014/0316825 | A1 | 10/2014 | Van Dijk et al. |
| 2014/0365348 | A1* | 12/2014 | Ballaro ............ G06Q 30/0601 705/30 |
| 2015/0063627 | A1 | 3/2015 | Mohammad et al. |
| 2015/0112842 | A1 | 4/2015 | Sieger et al. |
| 2016/0034590 | A1* | 2/2016 | Endras ............... G06F 16/9535 707/770 |
| 2016/0063430 | A1* | 3/2016 | Poncher ............ G06Q 10/087 705/28 |
| 2016/0140393 | A1 | 5/2016 | Schneider et al. |
| 2016/0163129 | A1 | 6/2016 | Elnajjar |
| 2017/0053557 | A1* | 2/2017 | Daniel ................... G09B 19/24 |
| 2018/0157982 | A1* | 6/2018 | Southall ............... G06Q 10/087 |
| 2019/0073641 | A1* | 3/2019 | Utke .................... G06K 9/6202 |

FOREIGN PATENT DOCUMENTS

| | | |
|---|---|---|
| CN | 104268783 A | 1/2015 |
| CN | 104392005 A | 3/2015 |
| CN | 105608428 A | 5/2016 |
| CN | 105931007 A | 9/2016 |
| CN | 106296118 A | 1/2017 |
| CN | 106709808 A | 5/2017 |
| CN | 106776681 A | 5/2017 |
| CN | 106796646 A | 5/2017 |
| CN | 107122484 A | 9/2017 |
| CN | 102132300 B | 2/2018 |
| CN | 107748893 A | 3/2018 |
| EP | 0982673 A2 | 3/2000 |
| TW | M481428 U | 7/2014 |
| TW | M522886 U | 6/2016 |

OTHER PUBLICATIONS

International Search Report and Written Opinion of the International Search Authority for International Application No. PCT/CN2018/107526, dated Dec. 29, 2018, partial Machine English translation, 10 pages.

International Preliminary Report on Patentability Chapter I for PCT Application No. PCT/CN2018/107526 dated Apr. 9, 2020.

First Search for Chinese Application No. 201710911173.2 dated Mar. 2, 2020.

Search Report for European Application No. 18861228.7 dated May 19, 2020.

Second Office Action for Chinese Application No. 201710911173.2 dated May 26, 2020.

* cited by examiner

US 10,713,865 B2

METHOD AND APPARATUS FOR IMPROVING VEHICLE LOSS ASSESSMENT IMAGE IDENTIFICATION RESULT, AND SERVER

CROSS-REFERENCE TO RELATED APPLICATIONS

The present application is a continuation application of International Patent Application No. PCT/CN2018/107526, filed on Sep. 26, 2018, and entitled "METHOD AND APPARATUS FOR IMPROVING VEHICLE LOSS ASSESSMENT IMAGE IDENTIFICATION RESULT, AND SERVER." The PCT application is based on and claims priority to the Chinese Patent Application No. 201710911173.2, filed on Sep. 29, 2017. All of the above-referenced applications are incorporated herein by reference in their entirety.

TECHNICAL FIELD

Embodiments of this specification relate to the field of vehicle damage assessment image processing technologies, and in particular, to systems and methods for improving the recognition results based on vehicle damage assessment images.

BACKGROUND

As the number of vehicles in use increases every year, the amount of insurance services of insurance companies has also been increasing. Thus, at present, a key industry research direction of various vehicle models is how to quickly and accurately provide users with vehicle damage assessment services.

During vehicle damage assessment, a damaged automotive part of a vehicle usually needs to be determined by recognizing a damage assessment image. The accuracy of recognizing a damaged automotive part mainly depends on an algorithm/model for damage assessment image recognition. A damaged part and an extent of damage are obtained by recognizing vehicle damage images (including image and video materials such as pictures and videos) by using various models/algorithms. Then a damage assessment result is obtained according to a corresponding maintenance and repair policy. At present, the model/algorithm used in the industry mainly collects appearance data of various vehicle models in advance, and then uses a constructed automotive part damage algorithm to recognize a damaged automotive part and an extent of damage in the damage assessment image. To ensure recognition precision, appearance image data of various vehicles are usually obtained as much as possible as sample images for training. The period for model algorithm training and parameter optimization is usually relatively long, and the overall implementation costs are relatively high. In addition, by recognizing a damaged automotive part in an image by purely relying on a model algorithm, the accuracy of recognizing a part is also limited to the amount of collected vehicle appearance image data. Therefore, during vehicle damage assessment image recognition, a processing solution providing lower implementation costs and more accurate recognition result is needed.

SUMMARY

In some embodiments, the disclosed methods, apparatus and servers may improve the precision and recognition efficiency for recognizing vehicle damage assessment images, and reduce the image recognition algorithm's overall training period and costs.

A method for automotive part recognition based on a vehicle damage assessment image, includes: determining a damaged automotive part of a vehicle by recognizing a damage assessment image of the vehicle based on an image recognition algorithm; obtaining an automotive part list of the vehicle, wherein the automotive part list comprises a plurality of automotive parts corresponding to a plurality of automotive part identification serial numbers; matching the damaged automotive part with the plurality of automotive parts in the automotive part list to determine an automotive part corresponding to the damaged automotive part; and outputting an automotive part identification serial number of the determined automotive part.

In some embodiments, the obtaining an automotive part list of the vehicle comprises: querying a database to obtain the automotive part list of the vehicle based on a vehicle identification code of the vehicle.

In some embodiments, the matching the damaged automotive part with the plurality of automotive parts in the automotive part list to determine an automotive part corresponding to the damaged automotive part comprises: querying whether the automotive part list comprises an automotive part matching a feature attribute of the damaged automotive part.

In some embodiments, the matching the damaged automotive part with the plurality of automotive parts in the automotive part list to determine an automotive part corresponding to the damaged automotive part further comprises: in response to that the automotive part list comprises an automotive part matching a feature attribute of the damaged automotive part, determining the automotive part to be corresponding to the damaged automotive part.

In some embodiments, the matching the damaged automotive part with the plurality of automotive parts in the automotive part list to determine an automotive part corresponding to the damaged automotive part comprises: in response to that the automotive part list comprises at least two sub-level automotive part categories of the damaged automotive part, re-recognizing the damage assessment image of the vehicle until a unique automotive part corresponding to the damaged automotive part is determined in one of the at least two sub-level automotive part categories, or an upper limit of times for recognizing the damage assessment image is reached.

In some embodiments, the method further comprises: in response to that the automotive part list does not comprise an automotive part matching the damaged automotive part, querying the automotive part list for an automotive part having an automotive part inclusion relationship with the damaged automotive part, and determining the automotive part to be corresponding to the damaged automotive part.

In some embodiments, the automotive part having the automotive part inclusion relationship with the damaged automotive part includes the damaged automotive part or is included in the damaged automotive part.

An apparatus for automotive part recognition based on a vehicle damage assessment image, comprises one or more processors and one or more non-transitory computer-readable memories coupled to the one or more processors and configured with instructions executable by the one or more processors to cause the apparatus to perform operations comprising: determining a damaged automotive part of a vehicle by recognizing a damage assessment image of the vehicle based on an image recognition algorithm; obtaining an automotive part list of the vehicle, wherein the automotive part list comprises a plurality of automotive parts corresponding to a plurality of automotive part identification serial numbers; matching the damaged automotive part with the plurality of automotive parts in the automotive part list to determine an automotive part corresponding to the damaged automotive part; and outputting an automotive part identification serial number of the determined automotive part.

A non-transitory computer-readable storage medium is configured with instructions executable by one or more processors to cause the one or more processors to perform operations comprising: determining a damaged automotive part of a vehicle by recognizing a damage assessment image of the vehicle based on an image recognition algorithm; obtaining an automotive part list of the vehicle, wherein the automotive part list comprises a plurality of automotive parts corresponding to a plurality of automotive part identification serial numbers; matching the damaged automotive part with the plurality of automotive parts in the automotive part list to determine an automotive part corresponding to the damaged automotive part; and outputting an automotive part identification serial number of the determined automotive part.

A server includes at least one processor and a memory for storing instructions executable by the processor, where the processor executes the instructions to implement: determining a damaged automotive part of a vehicle by recognizing a damage assessment image of the vehicle based on an image recognition algorithm; obtaining an automotive part list of the vehicle, wherein the automotive part list comprises a plurality of automotive parts corresponding to a plurality of automotive part identification serial numbers; matching the damaged automotive part with the plurality of automotive parts in the automotive part list to determine an automotive part corresponding to the damaged automotive part; and outputting an automotive part identification serial number of the determined automotive part.

According to the disclosed method, the apparatus, the non-transitory computer-readable storage medium, and the server for automotive part recognition based on a vehicle damage assessment image, after information about a damaged automotive part is preliminarily obtained by using the image recognition algorithm, a more precise automotive part serial number of the damaged automotive part can be obtained from the automotive part list of the vehicle. Thus, after the damage assessment image is recognized through a recognition algorithm, the more accurate automotive part serial number is output from the automotive part list, effectively improving the accuracy and precision for recognizing vehicle damage assessment images. According to the implementations provided in this specification, the automotive part identification serial number of the damaged automotive part of the vehicle can be output based on automotive part data at the individual vehicle level, so that the output result is more precise, recognition/purchase of the automotive part is greatly facilitated, the overall recognition costs and learning period with respect to the damage assessment image recognition algorithm are reduced, and the efficiency and accuracy of damaged automotive part recognition based on vehicle damage assessment image recognition are greatly improved.

BRIEF DESCRIPTION OF THE DRAWINGS

To describe the embodiments of this specification or in existing technologies more clearly, the following briefly describes the accompanying drawings for describing the embodiments or the existing technologies. Apparently, the accompanying drawings in the following description show merely some embodiments of this specification, and a person of ordinary skill in the art may still derive other drawings from these accompanying drawings without creative efforts.

DETAILED DESCRIPTION

Figure 1:
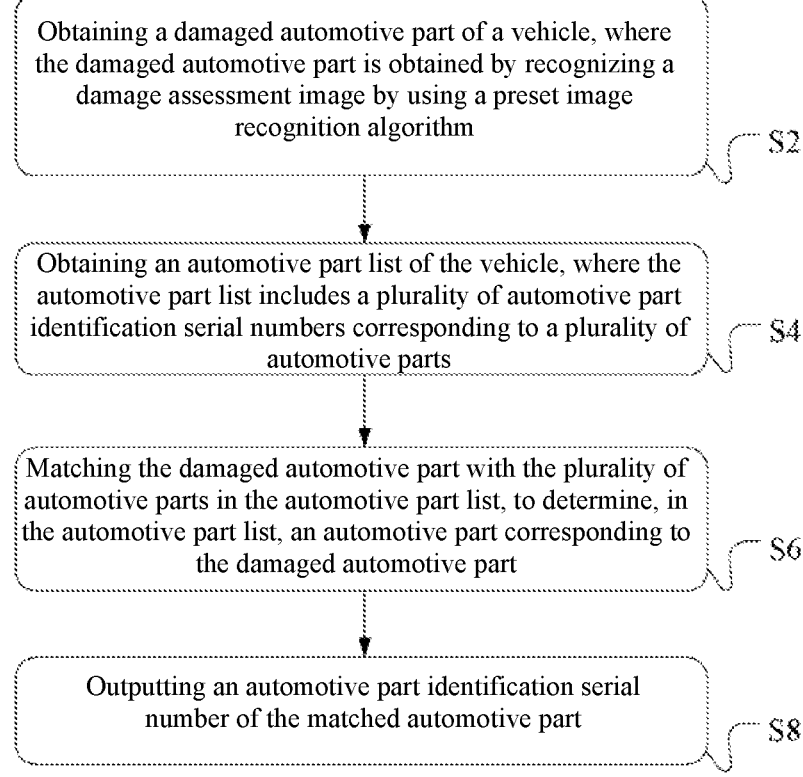
FIG. 1 is a schematic flowchart of a method for improving a recognition result based on a vehicle damage assessment image according to some embodiments of this specification.

To make a person skilled in the art better understand the technical solutions in this specification, the embodiments of this specification are clearly described in the following with reference to the accompanying drawings in the embodiments of this specification. Apparently, the described embodiments are merely some but not all of the embodiments of this specification. All other embodiments obtained by a person of ordinary skill in the art based on one or more embodiments of this specification without creative efforts shall fall within the protection scope of the embodiments of this specification.

Existing vehicles may be classified into various types. Due to different factors such as year, configurations (such as high, medium, and low configurations), and even personalized customization by manufacturers, automotive parts in the same location on vehicles with the same vehicle model may still have a relatively large difference, or may be even completely different. For example, for bumpers of the same vehicle model, a front bumper of a comfort configuration is integral, while a front bumper of a luxury configuration is three-stage. Alternatively, there is a trim on a bumper of a medium-configuration vehicle model, and there is no trim on a bumper of a low-configuration vehicle model. Existing processing solutions of recognizing a damaged automotive part of a vehicle by purely relying on image recognition technologies have difficulty in recognizing the foregoing differences, or requires an image recognition algorithm and sample data associated with higher costs and a longer learning period. Current vehicle manufacture has been increasingly standardized, so that automotive parts can be precisely purchased in the market by obtaining an automotive part identification serial numbers (also referred to as automotive part OE numbers, which indicate serial numbers of parts and accessories of a vehicle model manufactured by a vehicle manufacturer). Although vehicle models are different, manufacturers usually retain configuration information of each factory vehicle. Therefore, in the one or more embodiments of this specification, automotive part list information of a vehicle for damage assessment can be obtained by using a unique vehicle identification code of the vehicle. Then the automotive part list information is combined with an image recognition algorithm, so that the accuracy of a damaged automotive part recognition result using a damage assessment image algorithm can be significantly improved, and additional learning costs and a learning period of an image recognition algorithm/module can be greatly reduced.

According to methods for improving a damaged automotive part recognition result based on a vehicle damage assessment image provided in the embodiments of this specification, an automotive part list of a vehicle currently being processed can be obtained after a damaged automotive part of the vehicle is preliminarily obtained by using an image recognition algorithm. Automotive part information in the automotive part list and corresponding to the damaged automotive part is further determined from the automotive part list. For example, when it is recognized by using an image recognition model that the damaged automotive part is a bumper, the vehicle type configuration of which the bumper is may be learned according to a vehicle identification code (it is assumed that bumpers of a vehicle type with different configurations are different). For example, whether there is a trim outside the bumper may be learned. Then, an automotive part corresponding to the damaged automotive part in the automotive part list can be determined as the damaged automotive part of the vehicle. For example, the damaged automotive part is a "smoked black taillight" or a "bumper: bright silver ABS plating trim." In addition, an automotive part identification serial number of the automotive part can be obtained according to the automotive part list, and the automotive part identification serial number may be used for precise purchase of the automotive part; or the automotive part identification serial number may be fed back to a vehicle user or an insurance company along with other information, so that vehicle damage assessment-related processing can be performed more precisely based on the automotive part identification serial number.

FIG. 1 illustrates a schematic flowchart of a method for improving a recognition result based on a vehicle damage assessment image according to some embodiments of this specification. Although this specification provides method operational steps or apparatus structures shown in the following embodiments or accompany drawings, more operational steps or module units, or fewer operational steps or module units enabled by integrating some operational steps or module units may be included in the methods or the apparatuses based on conventional efforts or without creative efforts. In the steps or structures in which no necessary causal relationship logically exists, the execution order of the steps or the module structure of the apparatus is not limited to the execution orders or module structures shown in the embodiments or the accompany drawings of the embodiments of this specification. When the methods or module structures are applied to an apparatus, a server, or a terminal product in practice, sequential execution or parallel execution may be performed according to the methods or module structures shown in the embodiments or the accompany drawings (for example, in a parallel processor or multi-thread processing environment, or even in environments including distributed processing and server clustering).

The method provided in the embodiments of this specification can be applied to a server used for vehicle damage assessment image recognition processing, a client (such as a mobile terminal in which a damage assessment service application is installed) for taking photos on the scene for damage assessment image processing, or other electronic devices, to recognize a damage assessment image, and obtain an accurate automotive part identification serial number of a damaged automotive part of a vehicle from an automotive part list of the vehicle. For example, processing on a server side is used as an implementation scenario for description. As shown in FIG. 1, in the embodiments of the method for improving a recognition result based on a vehicle damage assessment image according to this specification, the method may include the following steps.

S2: Obtaining a damaged automotive part of a vehicle, where the damaged automotive part is obtained by recognizing a damage assessment image by using a preset image recognition algorithm.

A server may obtain damage assessment images of the vehicle, which may include an image captured by a mobile terminal on the scene and transmitted to the server, or may include an image obtained by a mobile storage device, a remote storage device, or other third-party service platforms. The image described in the implementations of this specification may be a general term for various graphics and images, may refer to an image having a visual effect, generally including images on paper, negatives or photographs, televisions, projectors, or computer screens. In some embodiments, the damage assessment image may include a single image of a vehicle or a video obtained through recording (a video may be considered as a set of continuous images). The server may determine the damaged automotive part and an extent of damage thereof in the damage assessment image by recognizing the damage assessment image of the vehicle. For example, the server may output a name of the damaged automotive part, and related data of the extent of damage, such as a label (such as a Chinese label or English label) of the damaged automotive part, a type (such as slight, severe, or the like) or a score value (such as 50%, 80%, or the like) of the extent of damage.

In some embodiments, a damaged automotive part recognition model for recognizing the damaged automotive part of the vehicle in the damage assessment image may be constructed in advance by using a designed image recognition algorithm. After early-stage sample training, the damaged automotive part recognition model may recognize a damage location and a damage type of an automotive part in the image of the part. In some embodiments, the image recognition algorithm may include some network model algorithms and variations of deep neural networks, and a processing algorithm of the damaged automotive part recognition model that is constructed by sample training. For example, the algorithm model for image recognition may be constructed based on a convolutional neural network (CNN) and a region proposal network (RPN) and in combination with a pooling layer, a fully-connected layer, and the like. After obtaining the damage assessment image, the server may recognize the damage assessment image by using the algorithm model, to determine the damaged automotive part of the vehicle from the damage assessment image.

The same type of models or algorithms may be selected as the foregoing image recognition algorithm. For example, multiple models and their variations based on the CNN and the RPN, such as Faster R-CNN, YOLO, and Mask-FCN, may be used. The CNN may include any CNN model, such as ResNet, Inception, VGG, or variations thereof. In some embodiments, the damaged automotive part may be represented by information, such as a name of the damaged automotive part, a damage type, and a degree, output after the processing by using the image recognition algorithm. In some embodiments, further automotive part recognition processing has not been performed on the damaged automotive part based on an automotive part list of the vehicle.

S4: Obtaining an automotive part list of the vehicle, where the automotive part list includes a plurality of automotive part identification serial numbers corresponding to a plurality of automotive parts.

In the foregoing descriptions, the information about the damaged automotive part that is obtained by using the image recognition algorithm may indicate a part, such as a bumper, a front door, or a taillight, of a vehicle model. However, for a vehicle model with different configurations, some parts are different, or appearance and shapes of some parts are greatly different. Therefore, in some embodiments of this specification, a vehicle identification code of the vehicle currently being processed may be obtained according to association information of the vehicle (such as identity information of an owner of the vehicle). The vehicle identification code is also referred to as a vehicle identification number (VIN) code. A VIN code is a unique identifier of each vehicle. Then, the automotive part list of the currently-being-processed vehicle is obtained according to the vehicle identification code. Therefore, in some embodiments, the obtaining an automotive part list of the vehicle may include: querying a database to obtain data of the automotive part list of the vehicle by using the vehicle identification code of the vehicle. For example, the database may be provided by car manufacturers.

The automotive part list may include data that describes each automotive part of the vehicle in detail and comprehensively. For example, different configuration levels of the same vehicle type may correspond to different automotive part lists, different manufacture years or months of the same vehicle type may correspond to different automotive part lists, or different engine capacities, manual/automatic speed changing boxes, or even vehicles of the same model soled online or at offline stores may correspond to different automotive part lists, etc. A personal or company-customized vehicle, or the like has a separate corresponding automotive part list.

The automotive part list may include automotive part data of each automotive part of the vehicle, such as a part name, a model, a specification, a feature, and the like. Generally, the automotive part list may further include an automotive part identification serial number corresponding to each automotive part. The automotive part identification serial numbers may be automotive part OE numbers, which refer to serial numbers of parts and accessories of a vehicle model manufactured by a main engine factory (automaker), and the serial numbers may be used for precise automotive part purchase on the market.

In some embodiments, the timing for obtaining the automotive part list may include: after the damaged automotive part is obtained through recognizing the damage assessment image, the vehicle identification code of the vehicle currently being processed is obtained, and then the automotive part list is queried according to the vehicle identification code. Alternatively, the automotive part list may be obtained in the process of transmitting the damage assessment image to the server or in the process of recognizing the damage assessment image by the server. In the embodiments of this specification, the damaged automotive part is obtained by using the image recognition algorithm, and then the automotive part identification serial number of the damaged automotive part of the vehicle is output based on the obtained automotive part list. In some embodiments of this specification, the timing for obtaining information about the automotive part list is not limited. In addition, a manner of obtaining the information about the automotive part list may include obtaining from an associated party.

S6: Matching the damaged automotive part with the plurality of automotive parts in the automotive part list, to determine, in the automotive part list, an automotive part corresponding to the damaged automotive part.

The vehicle identification code of the currently-being-processed vehicle is obtained, and detailed and comprehensive vehicle configuration information corresponding to the vehicle may be obtained according to the vehicle identification code of the vehicle. Further, the recognized damaged automotive part may be matched with the automotive parts in the automotive part list, to query whether there is an automotive part corresponding to the damaged automotive part.

For example, when the automotive part corresponding to the damaged automotive part is queried according to the automotive part list, if the automotive part list includes information that further indicates other feature attributes of the damaged automotive part, for example, a specification of the damaged automotive part, or a feature for distinguishing the vehicle from other vehicles of the same vehicle type, such as additional accessories or decorations. If there is such a feature attribute, corresponding automotive part information in the automotive part list may replace the damaged automotive part. That is, the automotive part in the automotive part list is determined as the automotive part corresponding to the damaged automotive part. Therefore, in some embodiments of the method provided in this specification, the matching the damaged automotive part with the plurality of automotive parts in the automotive part list, to determine, in the automotive part list, an automotive part corresponding to the damaged automotive part includes:

Querying whether the automotive part list includes an automotive part matching a feature attribute of the damaged automotive part, and if yes, determining the queried automotive part as the automotive part corresponding to the damaged automotive part.

For example, a damage assessment image of a vehicle C1 may be obtained, and the damaged automotive part determined by using an image recognition algorithm is a "bumper." Then, a vehicle identification code VIN code of the vehicle C1 is obtained as "WXXXXXXX0512," and a configuration table (e.g., an automotive part list) of the vehicle C1 may be obtained by using the VIN code. It is assumed that in different configuration levels, bumper configurations of the vehicle C1 are different. For example, bumpers of medium- and high-configuration vehicle models have trim strips, and a bumper of a high-configuration vehicle model has a bright silver ABS trim. After it is determined that the damaged automotive part obtained by recognizing the damage assessment image is the "bumper," automotive part data of the bumper of the vehicle C1 in the automotive part list may be obtained through querying according to the automotive part list of the vehicle C1, e.g., "bumper with a bright silver ABS plating trim." Thus, the queried automotive part data "bumper with a bright silver ABS plating trim" in the automotive part list may be determined as the data of the automotive part corresponding to the damaged automotive part.

In another example, attribute information may further indicate whether a front bumper is of a three-stage type or an integral type, whether a headlight is a halogen lamp or a xenon lamp, and whether a front passenger door has a side curtain airbag, etc. When the damaged automotive parts differ for vehicles of the same vehicle type, different vehicle configurations and different batches, some personalized configuration information in the damaged automotive parts may be further determined in the automotive part list according to some embodiments provided in this specification, thereby improving precision of recognizing the damaged automotive part in the damage assessment image.

In another implementation scenario, in addition to information for further determining other features of the damaged automotive part, vehicle configurations in the automotive part list further include multi-level classifications of different configuration locations for some parts. For example, the recognized damaged automotive part is a front bumper. However, the bumper of a corresponding vehicle model is divided into right and left, namely, a left front bumper and a right front bumper. Therefore, in some embodiments of the method in this specification, after the damaged automotive part is recognized, if the corresponding automotive part list has multiple classifications (or categories) of the part (which may be insured), an image of the damaged automotive part output by using the image recognition algorithm is recognized again, so that one of the multiple categories to which the damaged automotive part belongs is identified in the automotive part list. For example, the matching the damaged automotive part with the plurality of automotive parts in the automotive part list, to determine, in the automotive part list, an automotive part corresponding to the damaged automotive part may include the following steps.

If the automotive part list has at least two sub-level automotive part categories of the damaged automotive part, re-recognizing the damage assessment image corresponding to the damaged automotive part until a unique automotive part corresponding to the damaged automotive part is determined in one of the sub-level automotive part categories, or an upper limit of times for recognizing the damage assessment image is reached.

Some or all of the automotive part information in the automotive part list may be divided into different levels. The damaged automotive part may be divided into different classifications of automotive parts based on an automotive part installation location, material, assembly, and the like. The classification is not limited to classifications based on different locations, for example, classifying into a left front bumper, a right front bumper, upper and lower parts of an automotive part, and the like. In addition, classifications of some damaged automotive parts may also include classifications based on different models, different colors, different materials, and the like.

In a processing process based on the image recognition algorithm, when a difference between vehicles of different classifications cannot be recognized, the damage assessment image corresponding to the damaged automotive part may be recognized again, to determine the automotive part corresponding to the damaged automotive part in the automotive part list. In an implementation, the damage assessment image corresponding to the damaged automotive part may be entered to the image recognition algorithm again. That is, the damage assessment image corresponding to the damaged automotive part may be recognized by using the image recognition algorithm for recognizing the damaged automotive part again. In some embodiments, some parameters may further be adjusted when the recognition is performed again. In other embodiments, the recognition may be performed by alternatively using another image recognition algorithm different from the image recognition algorithm for recognizing the damaged automotive part, such as a recognition processing algorithm with respect to left and right locations, material, color, and the like, of the part. For example, a corresponding algorithm may be set according to different classifications such as locations, materials, and colors of the same automotive part type in the automotive part list. In this way, if the automotive part category of the damaged automotive part has further different classifications, recognition of the damage assessment image may be performed multiple times, or multiple recognition manners may be performed based on the automotive part data. Recognition is performed on this type of damage assessment images in such ways, enabling a more accurate result of recognizing the damaged automotive part in the damage assessment image to be obtained.

Figure 2:
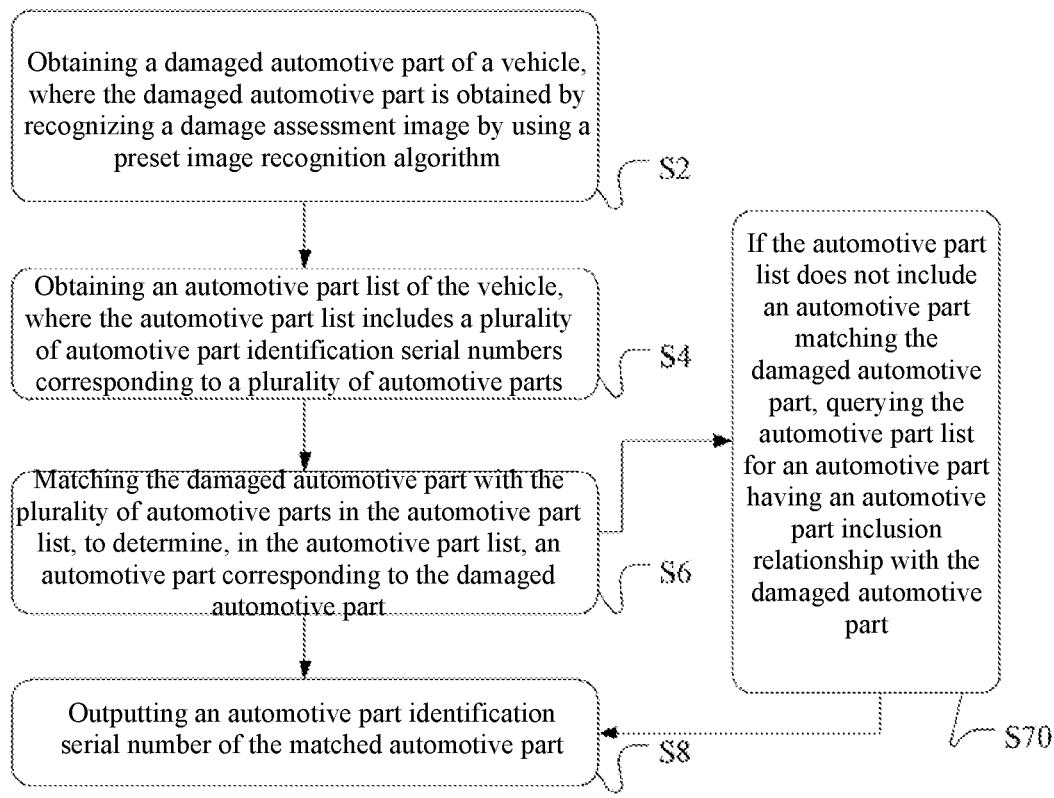
FIG. 2 is a schematic flowchart of another method for improving a recognition result based on a vehicle damage assessment image according to some embodiments of this specification.

FIG. 2 illustrates a schematic flowchart of another method for improving a recognition result based on a vehicle damage assessment image according to some embodiments of this specification. In some embodiments, if the automotive part categories do not include an automotive part matching the damaged automotive part, for example, the automotive part corresponding to the damaged automotive part cannot be found after the damage assessment image has been re-recognized, or a corresponding automotive part cannot be found in the automotive part list based on a name or a classification level of the damaged automotive part, it may indicate that the automotive part list does not have the damaged automotive part of the type. Then, an automotive part in a higher level or a lower level and having an inclusion relationship with the damaged automotive part may be queried in the automotive part list. For example, the automotive part having the automotive part inclusion relationship with the damaged automotive part includes the damaged automotive part or is included in the damaged automotive part. In some embodiments of the method provided in this specification, the method may further include the following step S70.

S70: If the automotive part list does not include an automotive part matching the damaged automotive part, querying the automotive part list for an automotive part having an automotive part inclusion relationship with the damaged automotive part, and determining the queried automotive part in the automotive part list as the automotive part corresponding to the damaged automotive part.

For example, the damaged automotive part recognized by the image recognition algorithm is a rear fender, and when the rear fender is not found in the automotive part list, a rear fender assembly can be queried for, where the rear fender assembly includes the rear fender. In some implementation scenarios, the automotive parts of a vehicle do not have a separate rear fender. If the rear fender is to be replaced, the automotive parts of an entire rear fender assembly are to be replaced. Similarly, when a rearview mirror is not found, an automotive part included in the damaged automotive part of the rearview mirror can be queried for, and an automotive part of a rearview mirror housing may be found.

S8: Outputting an automotive part identification serial number of the matched automotive part.

After the automotive part in the automotive part list corresponding to the vehicle is determined, the automotive part may be determined as the damaged automotive part of the vehicle. The automotive part list may include the automotive part identification serial number of the automotive part. In some embodiments, the automotive part identification serial number of the automotive part may be obtained from the automotive part list. The automotive part identification serial number may be used for precise automotive part determination, for facilitating market purchase or obtaining market price; or the automotive part identification serial number may be fed back to a vehicle user or an insurance company with other information, and the insurance company or third-party service platforms may perform vehicle damage assessment processing more precisely based on the automotive part identification serial number. For example, price data of the automotive part is queried by using the automotive part identification serial number, or damage assessment information of the vehicle is further determined based on the queried price data of the automotive part.

For example, it is determined by using data in the automotive part list that a damaged automotive part of a vehicle C1 is "bumper with a bright silver ABS plating trim," and an OE number of the automotive part (where the OE number of the automotive part is a type of the automotive part identification serial number) is F1DU-10300-AK, and a price of the automotive part may be queried for in a price library according to the OE number.

Figure 3:
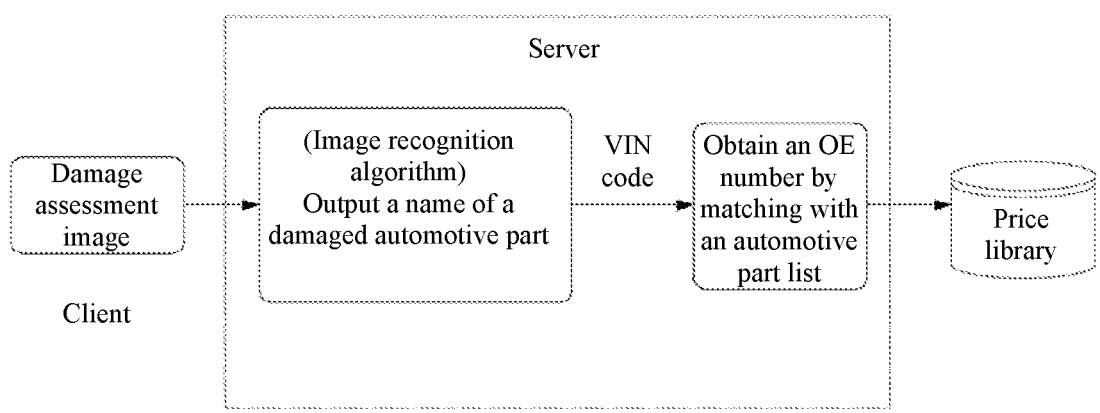
FIG. 3 is a schematic diagram of a processing procedure of an implementation scenario of performing damage assessment image processing according to some embodiments of this specification.

FIG. 3 is a schematic diagram of a processing procedure of an implementation scenario of performing damage assessment image processing according to some embodiments of this specification. A client may send a damage assessment image to a server, and the server obtains a damaged automotive part by using an image recognition algorithm and outputs a name (such as a Chinese name or English name) of the damaged automotive part. An automotive part list of a vehicle is obtained with reference to a VIN code of the vehicle, and the damaged automotive part is matched with the automotive parts in the automotive part list, to determine the automotive part corresponding to the damaged automotive part. Then, the automotive part may be converted into a corresponding OE number and then output. The output OE number may continue to be processed by the server. For example, a data library is queried by using the output OE number, or the output OE number may be sent to an insurance company or other third-party service parties for damage assessment processing.

A person skilled in the art can understand that the solutions provided in the embodiments of this specification can be applied to various vehicle damage assessment implementation scenarios, for example, vehicle damage assessment of an insurance company or a repair shop, or a vehicle damage assessment service provided by a 4S store or a cloud server, or damage assessment recognition processing provided by a server or a client. A terminal device for performing processing may include a separate processing server, or may include servers of other allies applying mutual communication to complete the implementation solutions; or a damaged automotive part or a part identification serial number that is identified by the server is sent to another server for damage assessment-related processing.

According to the methods for improving a damage part recognition result based on a vehicle damage assessment image provided in the embodiments of this specification, after information about a damaged automotive part is obtained by using an image recognition algorithm, a more precise automotive part serial number of the damaged automotive part can be obtained from the automotive part list of the vehicle. By outputting the more accurate automotive part serial number obtained from the automotive part list after recognizing the damage assessment image based on an algorithm, accuracy of an image recognition result is effectively improved, and image recognition precision is improved. According to the implementations provided in this specification, the automotive part identification serial number of the damaged automotive part of the vehicle can be output based on automotive part data information refined into an individual vehicle, so that the output result is more precise, recognition/purchase of the automotive part is greatly facilitated, the overall recognition costs and learning period of the damage assessment image recognition algorithm are reduced, and efficiency and accuracy of damaged automotive part recognition based on vehicle damage assessment image recognition are greatly improved.

Based on the foregoing methods for improving a damaged automotive part recognition result based on a vehicle damage assessment image, this specification further provides an apparatus for improving a damaged automotive part recognition based on a vehicle damage assessment image. The apparatus may include a system (including a distributed system), software (application), module, component, server, client, quantum computer, and the like, applying the methods in the embodiments of this specification and in combination with necessary implementation hardware. Based on the same idea, an apparatus provided in this specification is described in the following embodiments. Implementations of the methods and the apparatus for problem resolving are similar. Therefore, for implementations of the apparatus in the embodiments of this specification, refer to the implementations of the foregoing methods, and repetitions are not described. The following terms "unit" or "module" may refer to a combination of software and/or hardware having a predetermined function. Although the apparatus described in the following embodiments are implemented by using software, embodiments of the apparatus implemented by using hardware, or a combination of software and hardware are also possible and conceivable.

Figure 4:
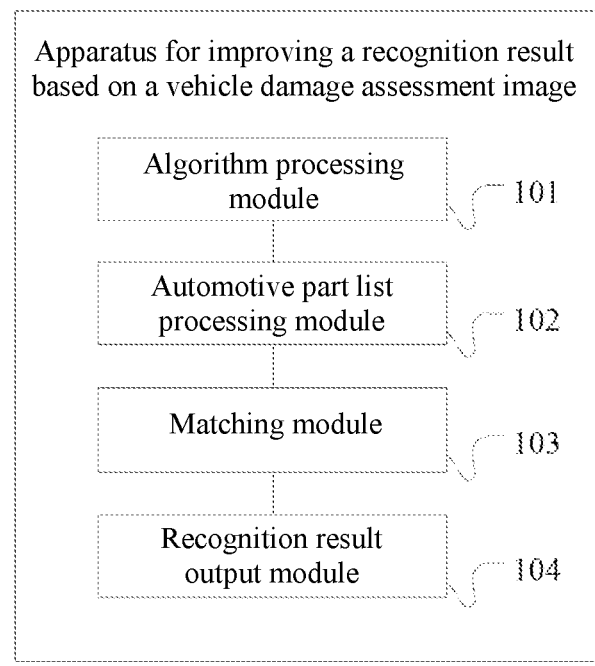
FIG. 4 is a schematic module structural diagram of an apparatus for improving a recognition result based on a vehicle damage assessment image according to some embodiments of this specification.

For example, FIG. 4 is a schematic module structural diagram of an apparatus for improving an recognition result based on a vehicle damage assessment image according to some embodiments of this specification. As shown in FIG. 4, the apparatus may include: an algorithm processing module 101, configured to obtain an damaged automotive part of a vehicle, where the damaged automotive part includes a damaged automotive part of the vehicle that is obtained by recognizing a damage assessment image by using a preset image recognition algorithm; an automotive part list processing module 102, configured to: obtain an automotive part list of the vehicle, and convert automotive part data in the automotive part list into corresponding automotive part identification serial numbers; a matching module 103, configured to: match the damaged automotive part with the automotive part list, to determine, in the automotive part list, an automotive part corresponding to the damaged automotive part; and a recognition result output module 104, configured to output an automotive part identification serial number of the matched automotive part.

The damaged automotive part of the vehicle is determined, and the automotive part identification serial number of the damaged automotive part is obtained, so that the automotive part can be precisely identified, to facilitate market purchase or obtaining a market price; or the automotive part identification serial number may be fed back to another associated party such as a vehicle user or an insurance company along with other information, so that the insurance company or third-party service platforms can perform vehicle damage assessment processing more precisely based on the automotive part identification serial number. In some embodiments of the apparatus, the automotive part list obtained by the automotive part list processing module 102 may include: automotive part list data of the vehicle obtained through querying by using a vehicle identification code of the vehicle.

In some embodiments of the apparatus, the matching module 103 may include: an automotive part feature module 1031, configured to: query whether the automotive part list includes an automotive part matching a feature attribute of the damaged automotive part, and if yes, determine the queried automotive part as the automotive part corresponding to the damaged automotive part.

Figure 5:
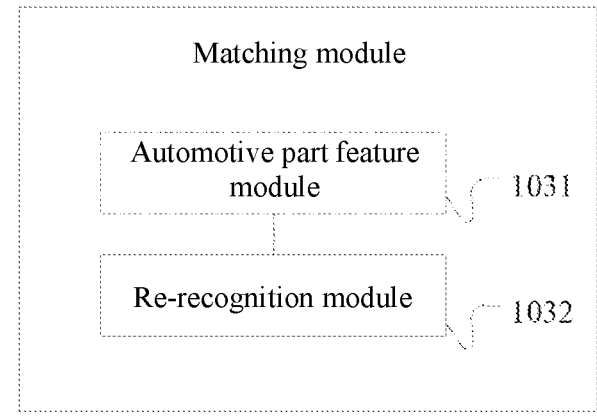
FIG. 5 is a schematic module structural diagram of another apparatus for improving a recognition result based on a vehicle damage assessment image according to some embodiments of this specification.

FIG. 5 is a schematic module structural diagram of another apparatus for improving a recognition result based on a vehicle damage assessment image according to some embodiments of this specification. As shown in FIG. 5, in some embodiments of the apparatus, the matching module 103 includes: a re-recognition module 1032, configured to: if the automotive part list includes at least two sub-level automotive part categories of the damaged automotive part, re-recognize the damage assessment image corresponding to the damaged automotive part until a unique automotive part corresponding to the damaged automotive part is determined in one of the sub-level automotive part categories, or an upper limit of times for recognizing the damage assessment image is reached.

For example, the re-recognition module 1032 may re-input the damage assessment image corresponding to the damaged automotive part into the algorithm processing module 101, and re-recognize the damage assessment image corresponding to the damaged automotive part by using the image recognition algorithm for recognizing the damaged automotive part. In some embodiments, an image recognition algorithm different from the image algorithm for recognizing the damaged automotive part may be used for re-recognition. For example, an algorithm for recognizing left and right positions, material, color, and the like, of the part may be used. A dashed line in FIG. 5 indicates an implementation of the module that can be connected in other embodiments.

Figure 6:
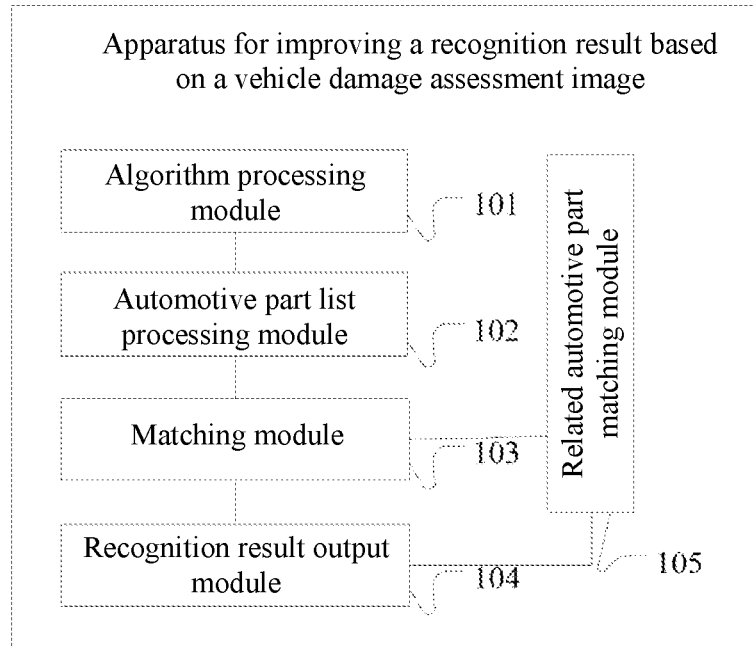
FIG. 6 is a schematic module structural diagram of still another apparatus for improving a recognition result based on a vehicle damage assessment image according to some embodiments of this specification.

FIG. 6 is a schematic module structural diagram of still another apparatus for improving a recognition result based on a vehicle damage assessment image according to some embodiments of this specification. As shown in FIG. 6, in some embodiments of the apparatus, the apparatus may further include: a related automotive part matching module 105, configured to: if the automotive part list does not include an automotive part matching the damaged automotive part, query the automotive part list for an automotive part having an automotive part inclusion relationship with the damaged automotive part, and determine the queried automotive part in the automotive part list as the automotive part corresponding to the damaged automotive part.

The methods for improving a damage part recognition based on a vehicle damage assessment image recognition provided in the embodiments of this specification may be implemented by a processor executing corresponding program instructions in a computing device, for example, by using a C++ language of a Windows operating system on a personal computer (PC) side, or by using hardware necessary for an application design language set corresponding to systems such as Linux, android, and iOS.

For example, an apparatus for improving a damage part recognition based on a vehicle damage assessment image recognition provided in this specification, may include a processor and a memory configured to store instructions executable by the processor, and the processor executes the instructions to implement: obtaining an damaged automotive part of a vehicle, where the damaged automotive part includes a damaged automotive part of the vehicle that is obtained by recognizing a damage assessment image by using a preset image recognition algorithm; obtaining an automotive part list of the vehicle, where the automotive part list includes a plurality of automotive part identification serial numbers corresponding to automotive part data; matching the damaged automotive part with the automotive part list, to determine, in the automotive part list, an automotive part corresponding to the damaged automotive part; and outputting an automotive part identification serial number of the matched automotive part.

The apparatus described above in the embodiments of this specification may further include other implementations according to descriptions of the related method embodiments. For an implementation, refer to the descriptions of the method embodiments, and details are not described herein again.

The embodiments of the specification are all described in a progressive manner. For same or similar parts in the embodiments, reference can be made among the embodiments. Each embodiment focuses on difference from other embodiments. For example, a hardware and program type embodiment is basically similar to a method embodiment, and therefore is described briefly; for related parts, refer to the part of descriptions in the method embodiment.

The embodiments of this specification are described above. Other embodiments are within the scope of the appended claims. In some embodiments, the actions or steps set forth in the claims may be performed in an order different from that in the embodiments and may still achieve the desired results. In addition, the processes depicted in the accompany drawings do not necessarily require a particular order or a sequential order for implementing the desired results. In some implementations, multitasking and parallel processing are also possible or may be advantageous.

According to the apparatus for improving a damaged automotive part recognition based on a vehicle damage assessment image recognition provided in the embodiments of this specification, after information about a damaged automotive part is obtained by using an image recognition algorithm, a more precise automotive part serial number of the damaged automotive part can be obtained from the automotive part list of the vehicle. Thus, after the damage assessment image is recognized through a recognition algorithm, the more accurate automotive part serial number is output from the automotive part list, effectively improving the accuracy and precision for damaged automotive part recognition based on a vehicle damage assessment image. According to the implementations provided in this specification, the automotive part identification serial number of the damaged automotive part of the vehicle can be output based on automotive part data at an individual vehicle level, so that the output result is more precise, recognition/purchase of the automotive part is greatly facilitated, the overall recognition costs and learning period with respect to the damage assessment image recognition algorithm are reduced, and efficiency and accuracy of damaged automotive part recognition based on vehicle damage assessment image recognition are greatly improved.

Figure 7:
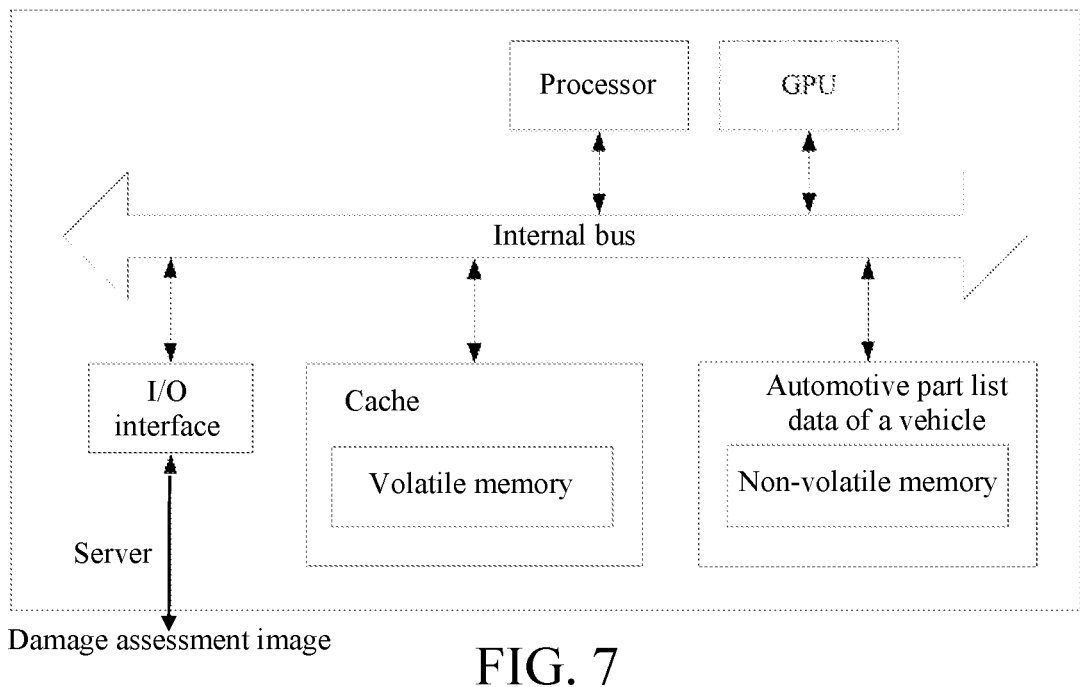
FIG. 7 is a schematic structural diagram of a server for improving a recognition result based on a vehicle damage assessment image according to some embodiments of this specification.

The apparatus or the methods described above can be applied to various electronic devices, to improve a damage part recognition result based on a vehicle damage assessment image recognition, to improve accuracy of the image recognition result, to reduce learning costs and learning period of the algorithm executing on a server, and to output accurate damaged automotive part information for a user, thereby improving user experience. FIG. 7 is a schematic structural diagram of a server for improving a recognition result based on a vehicle damage assessment image according to some embodiments of this specification. The server may include at least one processor and a memory for storing instructions executable by the at least one processor, the memory may be a computer storage medium of a volatile memory or a non-volatile memory, and the at least one processor executes the instructions to implement: obtaining an damaged automotive part of a vehicle, where the damaged automotive part includes a damaged automotive part of the vehicle that is obtained by recognizing a damage assessment image by using a preset image recognition algorithm; obtaining an automotive part list of the vehicle, where the automotive part list includes a plurality of automotive part identification serial numbers corresponding to automotive part data; matching the damaged automotive part with the automotive part list, to determine, in the automotive part list, an automotive part corresponding to the damaged automotive part; and outputting an automotive part identification serial number of the matched automotive part.

A structure of the server may further include other processing hardware, such as a graphics processing unit (GPU) or a bus.

The computer-readable storage medium may include a physical apparatus configured to store information. The information is stored by using a medium in an electrical, magnetic, optical, or other forms after the information is digitized. The computer-readable storage medium described in the embodiments may include: an apparatus that stores information by using electrical energy, for example, various types of memories such as a RAM and a ROM; an apparatus that stores information by using magnetic energy, for example, a hard disk, a floppy disk, a magnetic tape, a magnetic core memory, a bubble memory, or a USB flash drive; and an apparatus that optically stores information, for example, a CD or a DVD. There may be readable storage medium in other forms, for example, a quantum memory, or a graphene memory.

The server described above may further include other implementations according to descriptions of the method or apparatus embodiments. For implementations, refer to the descriptions of the method embodiments, and details are not described herein again.

According to the methods, apparatus, and server for improving a damage part recognition based on a vehicle damage assessment image recognition, provided in one or more embodiments of this specification, after information about a damaged automotive part is obtained by using an image recognition algorithm, a more precise automotive part serial number of the damaged automotive part can be obtained from the automotive part list of the vehicle. Thus, after the damage assessment image is recognized through a recognition algorithm, the more accurate automotive part serial number is output from the automotive part list, effectively improving the accuracy and precision for damaged automotive part recognition based on a vehicle damage assessment image. According to the implementations provided in this specification, the automotive part identification serial number of the damaged automotive part of the vehicle can be output based on automotive part data at an individual vehicle level, so that the output result is more precise, recognition/purchase of the automotive part is greatly facilitated, the overall recognition costs and learning period with respect to the damage assessment image recognition algorithm are reduced, and the efficiency and accuracy of damaged automotive part recognition based on vehicle damage assessment image recognition are greatly improved.

The embodiments of this specification describes image recognition, obtaining, interaction, calculation, determining, and the like, for example, the algorithm for recognizing the damaged automotive part by using the algorithm of the CNN network, hierarchical division of the automotive part list, re-recognition of the damaged image, automotive part price querying using the automotive part identification serial number. However, the embodiments of this specification are not limited to being in accordance with industry communication standards, standard image data processing protocols, network models, computer processing and database rules, or those described in the embodiments of this specification. Some industry standards or implementations that have been slightly modified in a customized manner or based on the implementations described in the embodiments can also achieve the same, equivalent, or similar effects as those of the foregoing embodiments, or predictable effects after the changes. Embodiments obtained after applying these modifications or changes to the data obtaining, storage, determining, and processing manners can still belong to the scope of optional implementations of this specification.

In the 1990s, improvements of a technology can be clearly distinguished between hardware improvements (for example, improvements to a circuit structure such as a diode, a transistor, a switch, etc.) and software improvements (improvements to method processes). However, with the development of technologies, improvements of many method processes can be considered as direct improvements of hardware circuit structures. Designers almost all program improved method processes to hardware circuits, to obtain corresponding hardware circuit structures. Therefore, it does not mean that the improvements of method processes cannot be implemented by using hardware entity modules. For example, a programmable logic device (PLD) such as a field programmable gate array (FPGA) is a type of integrated circuit whose logic function is determined by a user by programming the device. The designers perform voluntary programming to "integrate" a digital system into a single PLD without requiring a chip manufacturer to design and prepare a dedicated integrated circuit chip. In addition, instead of making an integrated circuit chip manually, the programming is mostly implemented by using "logic compiler" software, which is similar to the software compiler used to write programs. Original code before compiling is also written in a specific programming language, which is referred to as Hardware Description Language (HDL). There are many types of HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, Ruby Hardware Description Language (RHDL), etc. Currently, Very-High-Speed Integrated Circuit Hardware Description Language (VHDL) and Verilog are most commonly used. A person skilled in the art should also understand that as long as a method process is logically programmed and then programmed to an integrated circuit by using the foregoing hardware description languages, a hardware circuit that implements the logical method process can be easily obtained.

The controller can be implemented in any suitable manner, for example, the controller can take the form of, for example, a microprocessor or processor and a computer-readable medium storing computer-readable program code (for example, software or firmware) executable by the processor, a logic turnstile, a switch, an application-specific integrated circuit (ASIC), a programmable logic controller and an embedded microcontroller. Examples of the controller include, but are not limited to, the following microcontrollers: ARC 625D, Atmel AT91SAM, Microchip PIC18F26K20 and Silicone Labs C8051F320. The memory controller can also be implemented as part of the memory control logic. A person skilled in the art will also appreciate that, in addition to implementing the controller in the form of pure computer-readable program code, it is also possible to implement the controller in the form of a logic turnstile, switch, application-specific integrated circuit, programmable logic controller, and embedded microcontroller and other forms to achieve the same function. Such a controller can thus be deemed as a hardware component and devices included therein for implementing various functions can also be deemed as structures inside the hardware component. Alternatively, devices configured to implement various functions can be deemed as both software modules implementing the methods and structures inside the hardware component.

The systems, the devices, the modules or the units described in the foregoing embodiments can be implemented by a computer chip or an entity or implemented by a product having a particular function. A typical implementation device is a computing device. The computing device can be, for example, a personal computer, a laptop computer, an in-vehicle man-machine interaction device, a cellular phone, a camera phone, a smartphone, a personal digital assistant, a media player, a navigation device, an email device, a game console, a tablet computer, a wearable device, or a combination of any of these devices.

Although the embodiments of this specification provide method operation steps described in the embodiments or flowcharts, more or fewer operational steps operational steps may be included based on conventional means or non-creative means. The orders of the steps listed in the embodiments are merely some of multiple step execution orders, and do not indicate the only execution orders. When an actual apparatus or terminal product is executed, sequential execution or parallel execution may be performed according to the method orders shown in the embodiments or the accompany drawings (for example, in a parallel processor or multi-thread processing environment, and even a distributed data processing environment). The term "include," "comprise," or their variants is intended to cover a non-exclusive inclusion, so that a process, a method, a product, or a device that includes a series of elements not only includes such elements, but also includes other elements not expressly listed, or further includes elements inherent to such a process, method, product, or device. Unless otherwise indicated, other same or equivalent elements are not excluded from existing in the process, the method, the product, or the device that includes the elements.

For ease of description, when the foregoing apparatus is described, the apparatus is divided into modules according to functions described respectively. In the embodiments of this specification, the functions of the modules may be implemented in the same piece of or multiple pieces of software and/or hardware, or modules implementing the same function may be implemented by using a combination of multiple submodules or subunits. The foregoing described apparatus embodiments are merely examples. For example, the unit division is merely logical function division and there may be other division manners in other implementations. For example, multiple units or components may be combined or integrated into another system, or some features may be omitted or not performed. In addition, the displayed or discussed mutual couplings or direct couplings or communication connections may be implemented by using some interfaces. The indirect couplings or communication connections between the apparatus or units may be implemented in electronic, mechanical, or other forms.

A person skilled in the art will also appreciate that, in addition to implementing the controller in the form of pure computer-readable program code, it is also possible to implement the controller in the form of a logic turnstile, switch, application-specific integrated circuit, programmable logic controller, and embedded microcontroller and other forms to achieve the same functions. Such a controller can thus be deemed as a hardware component and devices included therein for implementing various functions can also be deemed as structures inside the hardware component. Alternatively, devices configured to implement various functions can be deemed as both software modules implementing the methods and structures inside the hardware component.

Embodiments of the specification is described with reference to the flowcharts and/or block diagrams of the methods, the devices (systems), and the computer program products. It should be understood that computer program instructions may be used to implement each process and/or each block in the flowcharts and/or the block diagrams and a combination of processes and/or blocks in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing functions in one or more processes in the flowcharts and/or in one or more blocks in the block diagrams.

These computer program instructions may be stored in a computer readable memory that can instruct the computer or any other programmable data processing device to work in some manner, so that the instructions stored in the computer readable memory generate an artifact that includes an instruction apparatus. The instruction apparatus implements some functions in one or more processes in the flowcharts and/or in one or more blocks in the block diagrams.

These computer program instructions may be loaded onto a computer or another programmable data processing device, so that a series of operations and steps are performed on the computer or the other programmable devices, thereby generating computer-implemented processing. Therefore, the instructions executed on the computer or the other programmable devices provide steps for implementing some functions in one or more processes in the flowcharts and/or in one or more blocks in the block diagrams.

In a typical configuration, the computer device includes one or more processors (CPUs), an input/output interface, a network interface, and a memory.

The memory may include, among computer readable media, a volatile memory such as a random access memory (RAM) and/or a non-volatile memory such as a read-only memory (ROM) or a flash memory (flash RAM). The memory is an example of the computer-readable medium.

The computer-readable medium includes non-volatile, volatile, movable, and unmovable media that may implement information storage by using any methods or technologies. Information may be computer-readable instructions, data structures, program modules, or other data. Examples of computer storage media include but are not limited to a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that computing devices can access. Based on the description in the specification, the computer-readable medium does not include transitory computer readable media (transitory media), such as a modulated data signal and a carrier.

A person skilled in the art should understand that the embodiments of this specification may be provided as a method, a system, or a computer program product. Therefore, the embodiments of this specification may use a form of hardware only embodiments, software only embodiments, or embodiments with a combination of software and hardware. Moreover, the embodiments of this specification may use a form of a computer program product that is implemented on one or more computer-usable storage media (including but not limited to a disk memory, a CD-ROM, an optical memory, and the like) that include computer-usable program code.

The embodiments of this specification can be described in the general context of executable computer instructions executed by a computer, for example, a program module. Generally, the program module includes a routine, a program, an object, a component, a data structure, and the like for executing a particular task or implementing a particular abstract data type. The embodiments of this specification may also be practiced in distributed computing environments in which tasks are performed by remote processing devices that are connected by using a communications network. In a distributed computing environment, the program module may be located in both local and remote computer storage media including storage devices.

The embodiments of the specification are all described in a progressive manner. For same or similar parts in the embodiments, reference can be made among the embodiments. Each embodiment focuses on difference from other embodiments. For example, a system embodiment is basically similar to a method embodiment, and therefore is described briefly; for related parts, refer to the part of descriptions in the method embodiment. In the descriptions of this specification, a description of a reference term such as "an embodiment," "some embodiments," "an example," "a specific example," or "some examples" means that a feature, structure, material, or characteristic that is described with reference to the embodiment or the example is included in at least one embodiment or example of the embodiments of this specification. In this specification, schematic descriptions of the foregoing terms do not necessarily directed at the same embodiment or example. Besides, the features, the structures, the materials or the characteristics that are described may be combined in proper manners in any one or more embodiments or examples. In addition, without mutual contradiction, a person skilled in the art can combine or group different embodiments or examples that are described in this specification and features of the different embodiments or examples.

The foregoing descriptions are merely embodiments of the embodiments of this specification, and are not intended to limit the embodiments of this specification. For a person skilled in the art, various modifications and changes may be made to the embodiments of this specification. Any modifications, equivalent replacements, and improvements made within the spirit and principle of the embodiments of this specification shall fall within the scope of the claims of the embodiments of this specification.

What is claimed is:

1. A computer-implemented method for automotive part recognition based on a vehicle damage assessment image, comprising:
   determining a damaged automotive part of a vehicle by recognizing a damage assessment image of the vehicle based on an image recognition algorithm;
   obtaining an automotive part list of the vehicle, wherein the automotive part list comprises a plurality of automotive parts corresponding to a plurality of automotive part identification serial numbers;
   matching the damaged automotive part with the plurality of automotive parts in the automotive part list to determine an automotive part corresponding to the damaged automotive part;
   outputting an automotive part identification serial number of the determined automotive part; and
   in response to that the automotive part list does not comprise an automotive part matching the damaged automotive part, querying the automotive part list for an automotive part having an automotive part inclusion relationship with the damaged automotive part, and determining the automotive part to be corresponding to the damaged automotive part.

2. The method according to claim 1, wherein the obtaining an automotive part list of the vehicle comprises:
   querying a database to obtain the automotive part list of the vehicle based on a vehicle identification code of the vehicle.

3. The method according to claim 1, wherein the matching the damaged automotive part with the plurality of automotive parts in the automotive part list to determine an automotive part corresponding to the damaged automotive part comprises:
   querying whether the automotive part list comprises an automotive part matching a feature attribute of the damaged automotive part.

4. The method according to claim 3, wherein the matching the damaged automotive part with the plurality of automotive parts in the automotive part list to determine an automotive part corresponding to the damaged automotive part further comprises:
   in response to that the automotive part list comprises an automotive part matching a feature attribute of the damaged automotive part, determining the automotive part to be corresponding to the damaged automotive part.

5. The method according to claim 1, wherein the matching the damaged automotive part with the plurality of automotive parts in the automotive part list to determine an automotive part corresponding to the damaged automotive part comprises:
   in response to that the automotive part list comprises at least two sub-level automotive part categories of the damaged automotive part, re-recognizing the damage assessment image of the vehicle until a unique automotive part corresponding to the damaged automotive part is determined in one of the at least two sub-level automotive part categories, or an upper limit of times for recognizing the damage assessment image is reached.

6. The method according to claim 1, wherein the automotive part having the automotive part inclusion relationship with the damaged automotive part includes the damaged automotive part or is included in the damaged automotive part.

7. An apparatus for automotive part recognition based on a vehicle damage assessment image, comprising one or more processors and one or more non-transitory computer-readable memories coupled to the one or more processors and configured with instructions executable by the one or more processors to cause the apparatus to perform operations comprising:
   determining a damaged automotive part of a vehicle by recognizing a damage assessment image of the vehicle based on an image recognition algorithm;
   obtaining an automotive part list of the vehicle, wherein the automotive part list comprises a plurality of automotive parts corresponding to a plurality of automotive part identification serial numbers;
   matching the damaged automotive part with the plurality of automotive parts in the automotive part list to determine an automotive part corresponding to the damaged automotive part;
   outputting an automotive part identification serial number of the determined automotive part; and
   in response to that the automotive part list does not comprise an automotive part matching the damaged automotive part, querying the automotive part list for an automotive part having an automotive part inclusion relationship with the damaged automotive part, and determining the automotive part to be corresponding to the damaged automotive part.

8. The apparatus according to claim 7, wherein the obtaining an automotive part list of the vehicle comprises:
   querying a database to obtain the automotive part list of the vehicle based on a vehicle identification code of the vehicle.

9. The apparatus according to claim 7, wherein the matching the damaged automotive part with the plurality of automotive parts in the automotive part list to determine an automotive part corresponding to the damaged automotive part comprises:
   querying whether the automotive part list comprises an automotive part matching a feature attribute of the damaged automotive part.

10. The apparatus according to claim 9, wherein the matching the damaged automotive part with the plurality of automotive parts in the automotive part list to determine an automotive part corresponding to the damaged automotive part further comprises:
   in response to that the automotive part list comprises an automotive part matching a feature attribute of the damaged automotive part, determining the automotive part to be corresponding to the damaged automotive part.

11. The apparatus according to claim 7, wherein the matching the damaged automotive part with the plurality of automotive parts in the automotive part list to determine an automotive part corresponding to the damaged automotive part comprises:
   in response to that the automotive part list comprises at least two sub-level automotive part categories of the damaged automotive part, re-recognizing the damage assessment image of the vehicle until a unique automotive part corresponding to the damaged automotive part is determined in one of the at least two sub-level automotive part categories, or an upper limit of times for recognizing the damage assessment image is reached.

12. The apparatus according to claim 7, wherein the automotive part having the automotive part inclusion relationship with the damaged automotive part includes the damaged automotive part or is included in the damaged automotive part.

13. A non-transitory computer-readable storage medium configured with instructions executable by one or more processors to cause the one or more processors to perform operations comprising:
   determining a damaged automotive part of a vehicle by recognizing a damage assessment image of the vehicle based on an image recognition algorithm;
   obtaining an automotive part list of the vehicle, wherein the automotive part list comprises a plurality of automotive parts corresponding to a plurality of automotive part identification serial numbers;
   matching the damaged automotive part with the plurality of automotive parts in the automotive part list to determine an automotive part corresponding to the damaged automotive part;
   outputting an automotive part identification serial number of the determined automotive part; and
   in response to that the automotive part list does not comprise an automotive part matching the damaged automotive part, querying the automotive part list for an automotive part having an automotive part inclusion relationship with the damaged automotive part, and determining the automotive part to be corresponding to the damaged automotive part.

14. The non-transitory computer-readable storage medium according to claim 13, wherein the obtaining an automotive part list of the vehicle comprises:
   querying a database to obtain the automotive part list of the vehicle based on a vehicle identification code of the vehicle.

15. The non-transitory computer-readable storage medium according to claim 13, wherein the matching the damaged automotive part with the plurality of automotive parts in the automotive part list to determine an automotive part corresponding to the damaged automotive part comprises:
   querying whether the automotive part list comprises an automotive part matching a feature attribute of the damaged automotive part.

16. The non-transitory computer-readable storage medium according to claim 15, wherein the matching the damaged automotive part with the plurality of automotive parts in the automotive part list to determine an automotive part corresponding to the damaged automotive part further comprises:
   in response to that the automotive part list comprises an automotive part matching a feature attribute of the damaged automotive part, determining the automotive part to be corresponding to the damaged automotive part.

17. The non-transitory computer-readable storage medium according to claim 13, wherein the matching the damaged automotive part with the plurality of automotive parts in the automotive part list to determine an automotive part corresponding to the damaged automotive part comprises:

in response to that the automotive part list comprises at least two sub-level automotive part categories of the damaged automotive part, re-recognizing the damage assessment image of the vehicle until a unique automotive part corresponding to the damaged automotive part is determined in one of the at least two sub-level automotive part categories, or an upper limit of times for recognizing the damage assessment image is reached.

* * * * *